U.S. Patent No.: US 8,107,518 B2
Date of Patent: Jan. 31, 2012

(12) United States Patent
Vijayan et al.

(54) STREAM WEIGHT ESTIMATION AND COMPENSATION IN SIMO/MIMO OFDM RECEIVERS

(75) Inventors: Logeshwaran Vijayan, Chennai (IN); Sundaram Vanka, Notre Dame, IN (US); Partha Sarathy Murali, San Jose, CA (US); Phanimithra Gangalakurthi, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 779 days.

(21) Appl. No.: 12/185,733

(22) Filed: Aug. 4, 2008

(65) Prior Publication Data

US 2010/0027693 A1 Feb. 4, 2010

(51) Int. Cl.
*H03H 7/30* (2006.01)
(52) U.S. Cl. .................................................. 375/229
(58) Field of Classification Search ......... 375/239–236
See application file for complete search history.

(56) References Cited

U.S. PATENT DOCUMENTS

2008/0075158 A1 * 3/2008 Li ............................... 375/232
* cited by examiner

*Primary Examiner* — Kevin Kim
(74) *Attorney, Agent, or Firm* — File-EE-Patents.com; Jay A. Chesavage (57) ABSTRACT

A process for equalizing streams of OFDM subcarrier data computes the noise variance for each stream, and forms a stream weighting coefficient by equalizing the noise variance, such that for a first stream having a noise variance $\sigma_1$ and a second stream having a noise variance of $\sigma_2$, the first stream is scaled by

$$k_1 = \frac{\sqrt{2}\,\sigma_2}{\sqrt{\sigma_1^2 + \sigma_2^2}}$$

and the second stream is scaled by $$k_2 = \frac{\sqrt{2}\,\sigma_1}{\sqrt{\sigma_1^2 + \sigma_2^2}}.$$

15 Claims, 5 Drawing Sheets

FFT Data and Channel Estimation Stream Weighting

Figure 1

MIMO 2x2 Transmitter/Receiver Link
Prior Art

$$\begin{bmatrix} Y_1 \\ Y_2 \end{bmatrix} = \begin{bmatrix} H_{11} & H_{12} \\ H_{21} & H_{22} \end{bmatrix} * \begin{bmatrix} X_1 \\ X_2 \end{bmatrix} + \begin{bmatrix} N_1 \\ N_2 \end{bmatrix}$$

Figure 3

MIMO 3x3 Transmitter/Receiver Link
Prior Art

Figure 4

$$\begin{bmatrix} Y_1 \\ Y_2 \\ Y_3 \end{bmatrix} = \begin{bmatrix} H_{11} & H_{12} & H_{13} \\ H_{21} & H_{22} & H_{23} \\ H_{31} & H_{32} & H_{33} \end{bmatrix} * \begin{bmatrix} X_1 \\ X_2 \\ X_3 \end{bmatrix} + \begin{bmatrix} N_1 \\ N_2 \\ N_3 \end{bmatrix}$$

Figure 5
deriving $\hat{x}_1$ from $\hat{x}_2$
prior art $Y = H*X + N$    (Eq 5.1)

$Y = [Q*R]*X + N$    (Eq 5.2)

$Q^H Y = [Q^H * Q * R]*X + Q^H * N$    (Eq 5.3)

$Q^H Y = R*X + Q^H * N$    (Eq 5.4)

$Z = Q^H Y$    (Eq 5.5)

$Z = R*X + Q^H * N$    (Eq 5.6)    (noise term)

$$\begin{bmatrix} z_1 \\ z_2 \end{bmatrix} = \begin{bmatrix} r_{11} & r_{12} \\ 0 & r_{22} \end{bmatrix} * \begin{bmatrix} x_1 \\ x_2 \end{bmatrix} + \begin{bmatrix} Q^H N_1 \\ Q^H N_2 \end{bmatrix} \quad (Eq\ 5.7)$$

$z_1 = r_{11}*x_1 + r_{12}*x_2 + N1$   => hard values for x1 decision (Eq 5.8)

$z_2 = r_{22}*x_2 + N2$   (Eq 5.9) => hard values for x2 decision

$z'_1 = r'_{11}*x_2 + r'_{12}*x_1 + N1$   (Eq 5.10)

$z'_2 = r'_{22}*x_1 + n2$   (Eq 5.11)

Figure 6
prior art
QAM-64

Figure 7A
Stream Weight Compensation for SIMO

Figure 7B
Stream Weight Compensation for MIMO

*Figure 8*
MIMO Stream Equalization

*Figure 9*
FFT Data and Channel Estimation Stream Weighting

STREAM WEIGHT ESTIMATION AND COMPENSATION IN SIMO/MIMO OFDM RECEIVERS

FIELD OF THE INVENTION

The present application relates to combining signals received over multiple antennas in a wireless communication system. More specifically, it relates to a method for estimating scaling factors which are then applied to the signal received in each antenna of a multiple input multiple output (MIMO), or single input multiple output (SIMO) OFDM communications system and compensating the signals with this factor.

BACKGROUND OF THE INVENTION

A MIMO system typically includes a plurality of antennas, each antenna coupled to an RF front end for mixing to a baseband signal stream, each baseband signal stream coupled to an analog to digital converter (ADC). Each ADC output is coupled to an automatic gain control (AGC) and also to a timing and frequency synchronization, and to an FFT for conversion of received symbols into associated subcarriers. A channel estimation provides per-subcarrier compensation of the FFT responses, and the FFT outputs are provided to an equalizer and to a log likelihood ratio (LLR) for decoding into received symbols. MIMO stream decoding often uses a QR Decomposition (QRD), whereby the channel estimation H matrix is decomposed into a Q and R matrix with the property that H=Q*R where Q is an upper triangular unitary matrix with real diagonal elements. The QR decomposition is then used by the MIMO decoder to demodulate the received subcarriers across the plurality of receive streams into streams of data.

Figure 1:
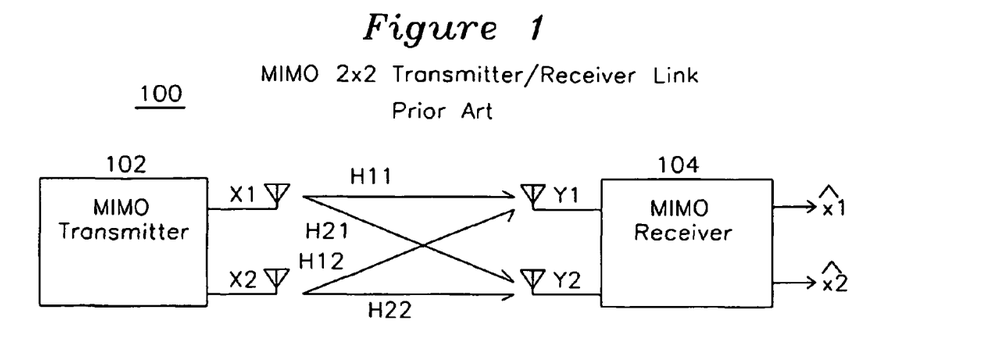
FIG. 1 shows a block diagram for a 2×2 MIMO transmitter/receiver link.

FIG. 1 shows a multiple-input multiple-output (MIMO) wireless transmitter/receiver 100 for n=2 streams. MIMO transmitter 102 includes two antennas which transmit original data x1 and x2, where the antennas are typically separated by a short distance, which may be a quarter of a wavelength for the carrier frequency, or any convenient separation distance. For each separate transmit symbol stream X1, X2 the value received at receiver 104 inputs Y1 and Y2 represents the superposition of these X1 and X2 symbols according to the communications channel between each transmit antenna and receive antenna. The object of receiver 104 is to recover estimates x1 and x2 of the originally transmitted data streams x1 and x2. For a 2×2 (2 input, 2 output) transmitter/receiver pair, the H matrix channels for input y1 are h11 and h12, and the channels for input y2 are h12 and h22.

Figure 2:
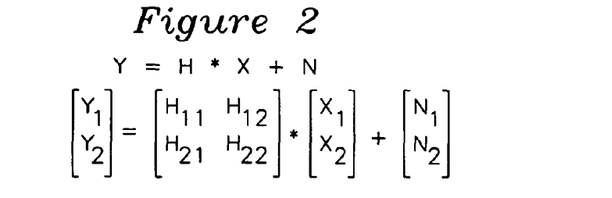
FIG. 2 shows the equations of operation for FIG. 1.

FIG. 2 shows the matrix equations of operation for the receiver of FIG. 1, where H is known as the channel estimate matrix, and is populated with channel characteristic values determined during a preamble interval.

Figure 3:
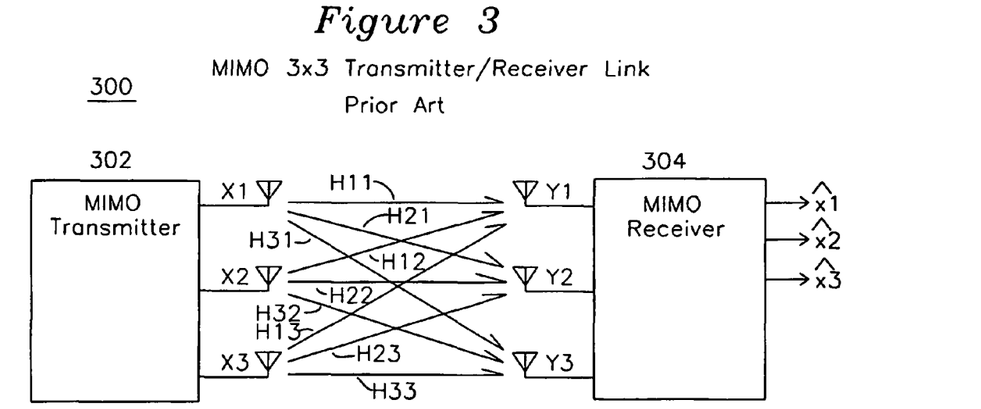
FIG. 3 shows a block diagram for a 3×3 MIMO transmitter/receiver link.
Figure 4:
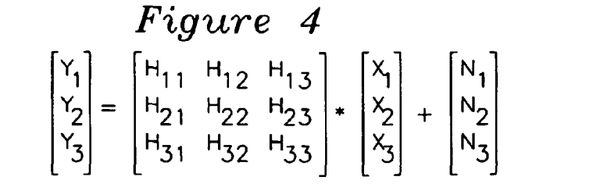
FIG. 4 shows the equations of operation for FIG. 3.

FIG. 3 shows a 3×3 MIMO transmitter/receiver link, where transmitter 302 includes three transmit antennas and receiver 204 includes three receive antennas. The respective communications channels for input y1, y2, and y3 are {h11, h12, h13}, {h21, h22, h23}, and {h31, h32, h33}. Each transmit symbol stream X1, X2, X3 typically carries a unique stream of data, and the objective of the MIMO receiver 304 is to segregate and recover each stream of data in the form of a hard decision representing the most likely transmitted value, and a soft decision representing the certainty of each bit of the hard decision. FIG. 4 shows the matrix equations for the transmitter and receiver of FIG. 3. As before, Y is the transmitted value, H is the channel estimate matrix, X is the received value, and N is the channel noise.

For clarity of terminology, the number of spatial streams is the number of unique streams that are transmitted from the transmitter (one in SIMO or more than one in MIMO). The number of receive streams is equal to the number of receive antennas present at the receiver, and each receive stream is coupled to an associated FFT. For example, for 1×N (SIMO), there is 1 stream of data transmitted from 1 transmit antenna and received by N receive antennas, providing a system with one spatial stream and N receive streams. For 2×3 MIMO, the number of spatial streams is 2 and the number of receive streams is 3. It is also possible to support fewer than the maximum number of spatial streams by duplicating streams in separate transmit antennas, such as in a 3×3 MIMO system with three transmit antennas and three receive streams/antennas, but where the transmitter generates only two unique spatial streams, which are mapped to three transmit antennas by transmitting the first spatial stream in the first transmit antenna, and the second spatial stream in the second as well as in the third transmit antenna. The maximum data rate of this 3×3 system will be the same as the maximum rate of the 2×3 system since only two unique spatial streams of data are transmitted by the transmitter for each system.

Figure 5:
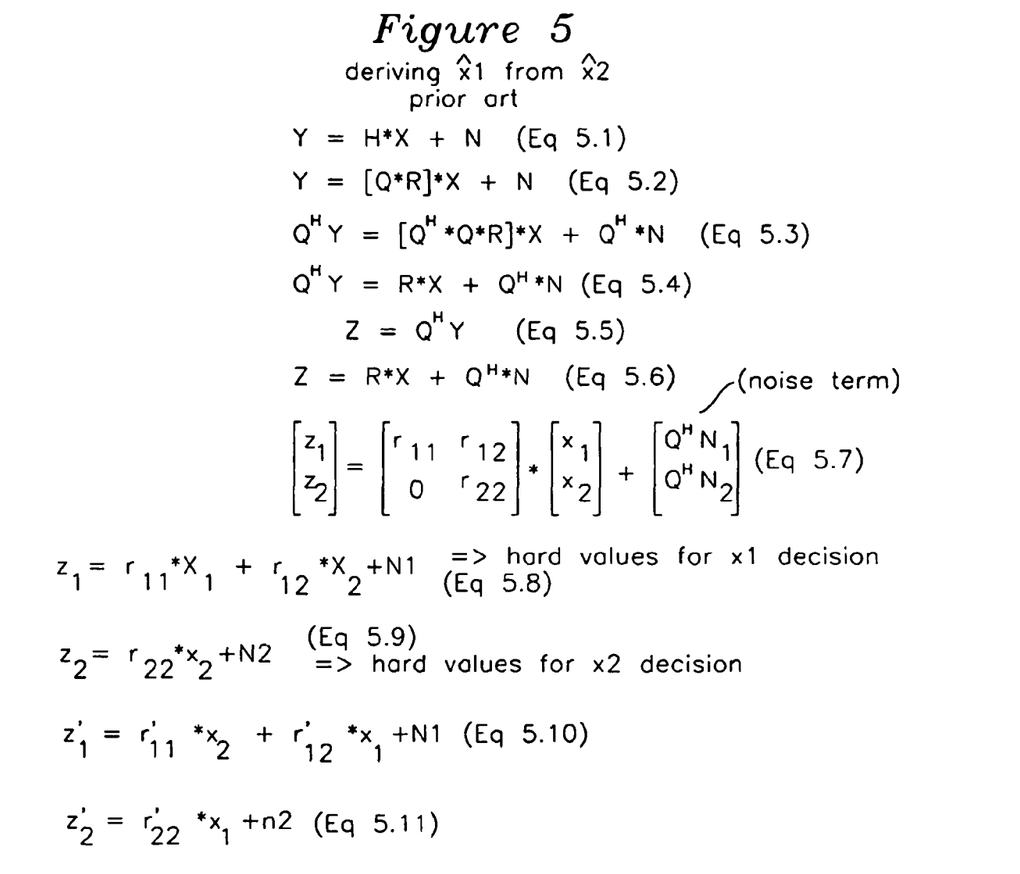
FIG. 5 shows the equations for a QR Decomposition.

FIG. 5 shows a transformation which is useful for separating spatially coded streams of symbol data containing x1 and x2 into their separated constituent values. Equation 5.1 is the previously described receiver equation, and equation 5.2 introduces the QR transformation, where the matrix R is in the form of an upper triangular matrix. The H channel characteristic matrix is decomposed into a unitary Q matrix and an R matrix such that H=Q*R and, when substituted into the receiver equation 5.1, generates equation 5.2. Equation 5.3 shows the multiplication by $Q^H$ ($Q^H$ indicating the hermitian matrix of Q, whereby the unitary property of matrix Q results in $Q^H Q = I$ the diagonal identity matrix). As Q is a unitary matrix, the channel noise represented by N is unchanged after multiplication by $Q^H$. The R matrix is an upper triangular matrix with the property that the main diagonal elements are purely real quantities, whereas the upper triangular entries above the main diagonal may be complex. This transformation results in the matrix form of equation 5.7, which produces equation 5.9 which is reduced to one x2 variable, and equation 5.8 which has both x1 and x2 variables. By transforming the received Y values into Z values through multiplication by $Q^H$, it is possible to directly solve equation 5.9 for the x2 value using a metric such as minimum distance from z2. It is then possible to substitute this value x2 into equation 5.8 with z1 to solve for x1. The noise terms of equation 5.7 are ignored, as they represent non-deterministic values forming the expanded square regions 604 around possible symbol points 602 of FIG. 6.

Figure 6:
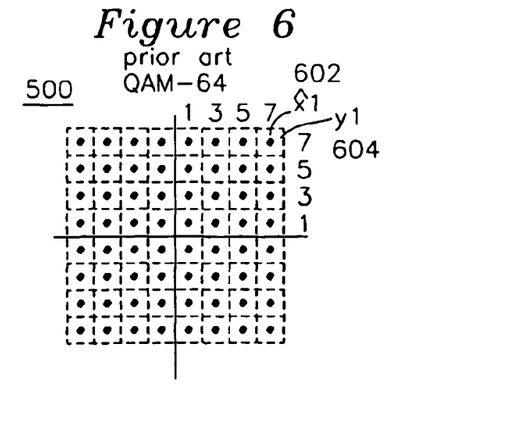
FIG. 6 shows a received and estimated signal for QAM-64 modulation in an OFDM system.

FIG. 6 shows the constellation diagram in I and Q space for QAM-64, whereby 64 different symbols may be transmitted using the I and Q data values by using variations in amplitude and phase to place the transmitted signal into one of the constellation points. Point 602 represents an estimated transmit value x1, and region y1 604 represents a region of points which would be resolved to the most likely estimated transmit value x1.

It is desired to provide an apparatus and method for using stream noise variance to compute and apply scaling factors for use in compensating a data stream and associated equalization matrix entry, where each stream uses a scaling factor calculated for that particular stream.

OBJECTS OF THE INVENTION

A first object of this invention is the generation of a plurality of stream weights for use in weighting a plurality of MIMO streams.

A second object of the invention is the equalization of stream strength by per-stream noise energy.

A third object of the invention is to provide a scaling factor for a plurality of baseband streams of OFDM FFT symbols by multiplying the subcarrier of each stream by a value derived from the noise content of the current stream compared to the noise content of other streams.

A fourth object of the invention is the characterization of noise variance $\sigma_j^2$ or each jth stream from among streams 1 through n, and the multiplication of the subcarrier data of each stream by a uniform scaling value for each stream equal to $$s_j = \frac{\sqrt{n}\,(\sigma_1 * \ldots * \sigma_n)/\sigma_j}{\sqrt{\sum_{k=1}^{n}(\sigma_1^2 * \ldots * \sigma_n^2)/\sigma_k^2}}$$

A fifth object of the invention is the use of AGC to substantially equalize signal strength, and the use of stream weight equalization using noise estimate to equalize stream SNR.

SUMMARY OF THE INVENTION

A receiver for orthogonal frequency division multiplexing (OFDM) has n receive streams, each receive stream from an analog to digital converter (ADC). Each receive stream has an associated noise estimate N and a channel estimate H, and the combined receive streams carry m spatial streams, where m is less than or equal to n. Each receive stream is applied to an FFT, which FFT output generates an FFT stream representing the subcarriers of the associated receive stream. For each FFT stream and associated channel characteristic H, the subcarriers of each associated FFT stream and H are multiplied by weighting constants determined by the noise N associated with each FFT stream. While AGC adjusts the gain to substantially equalize the channels for overall power level (signal plus noise plus interference), the stream weight compensator equalizes the FFT output channels for noise power level.

In one embodiment of the invention for n FFT output streams $y_1(k)$ through $y_n(k)$ where k is the subcarrier index, each FFT output stream $y_1(k)$ through $y_n(k)$ having an associated channel characteristic $h_{11}(k)$ through $h_{1m}(k)$ and noise estimate N in the form $[\sigma_1$ through $\sigma_n]$, a stream weight compensator generates $y_1'(k)$ through $y_n'(k)$ by multiplying each stream $y_1(k)$ through $y_n(k)$ by a scaling coefficient $s_j$ computed for each stream according to:

$$s_j = \frac{\sqrt{n}\,(\sigma_1 * \ldots * \sigma_n)/\sigma_j}{\sqrt{\sum_{k=1}^{n}(\sigma_1^2 * \ldots * \sigma_n^2)/\sigma_k^2}}$$

DETAILED DESCRIPTION OF THE INVENTION

Figure 7A:
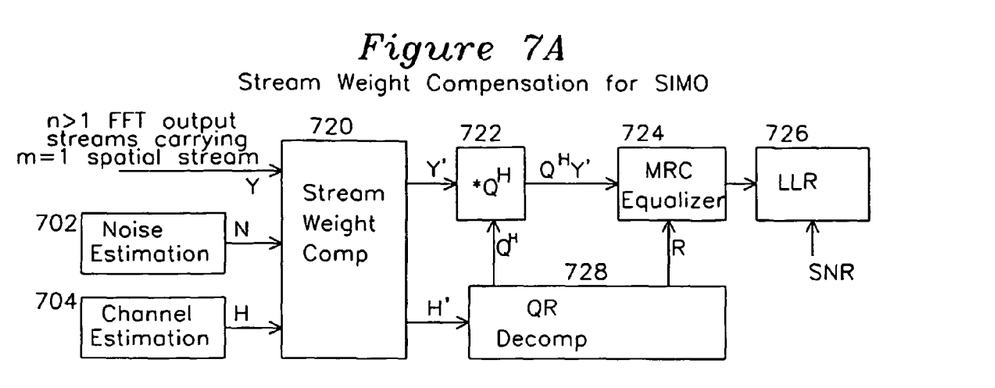
FIG. 7A shows a block diagram for stream weight compensation in a SIMO signal processing system.
Figure 7B:
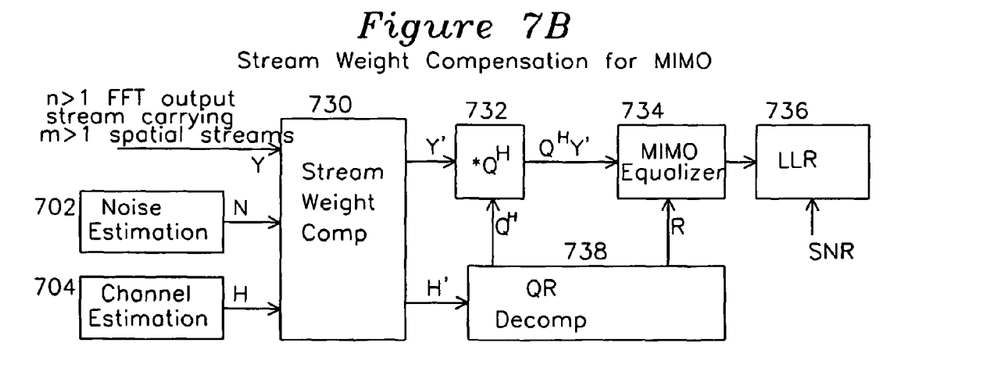
FIG. 7B shows a block diagram for stream weight compensation in a MIMO signal processing system.

FIGS. 7A and 7B show examples of stream weight compensation for SIMO (single input multiple output), and MIMO (multiple input multiple output) systems, respectively. The blocks used for FIGS. 7A and 7B which perform identical function include the per-receive channel noise estimation 702, which estimates noise variance per channel. In the best mode, noise estimator 702 performs this estimate based on the packet preamble. The noise estimate from preamble may be performed according to the methods described in U.S. Pat. No. 7,295,144 and U.S. patent application Ser. No. 11/439,000, which are incorporated in their entirety by reference. Channel estimator 704 produces the H channel characterization matrix using any method known in the prior art.

FIG. 7A shows the signal processing for SIMO, where a plurality of FFT output streams carry a single spatial stream. The stream weight compensator 720 scales the Y and H for each channel using scaling values computed from N to produce Y' and H'. The QR decomposition 728 generates values used by multiplier 722 which produces $Q^H Y'$ for maximum ratio combining (MRC) equalizer 724 in combination with R. An LLR 726 may be used for form a decision from equalizer outputs, as before.

FIG. 7B shows the stream weight compensator operating in a MIMO stream, where a plurality n of FFT output streams carry a plurality m spatial streams of data, where m<=n. The stream weight compensator accepts Y and H to produce Y' and H' for MIMO streams, which are multiplied 732 by $Q^H$ as before to provide $Q^H Y'$ and R to the STBC or MRC equalizer 734, either of which may be used in the present invention. LLR 736 may use SNR to decide symbols from the equalizer 734, as before.

Figure 8:
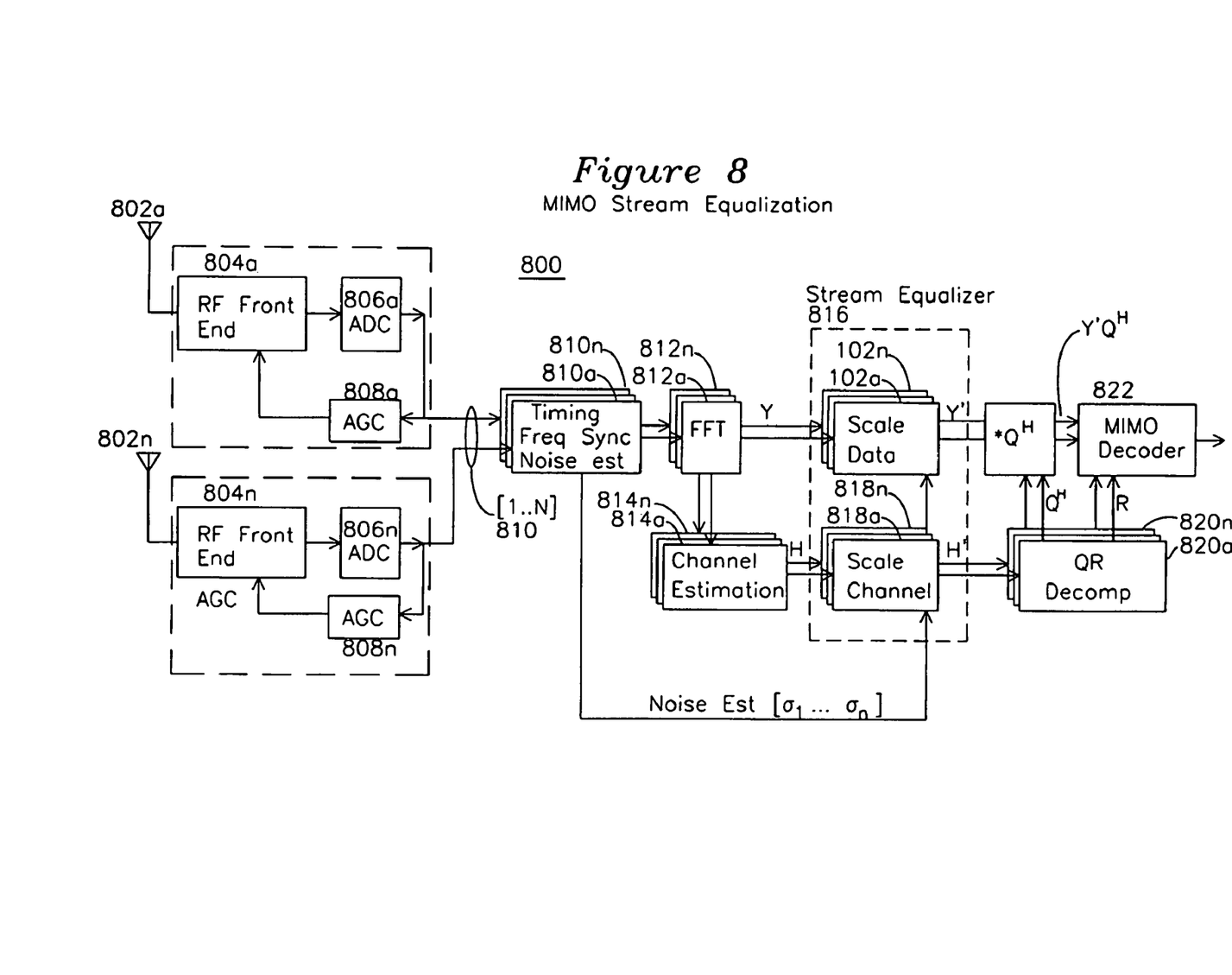
FIG. 8 shows the block diagram for a MIMO OFDM receiver signal processing system.

FIG. 8 shows the receiver signal processing for a MIMO receiver having N streams of ADC data from front ends 804a . . . 804n. Each signal stream is associated with an antenna, shown with the suffix "a" through "n". Following a stream with an "a" suffix, antenna 802a is coupled to RF front end 804a which performs amplification and baseband conversion, producing a baseband analog signal which is sampled by ADC 806a and provided as digital output 810a. The output signal level of a particular channel is measured by AGC 808a, which determines a suitable gain control value to apply to RF front end 804a. ADC 806a is also applied to timing frequency synchronization 810a, which performs preamble synchronization and generates an output stream suitable for application to the FFT 812a. During a preamble interval, an noise estimate for each channel is made and provided to the stream equalizer as noise variances $[\sigma_1 \ldots \sigma_n]$. A channel estimation 814a generates channel characterization matrix H from the FFT during the preamble portion. During the data portion, the FFT output is coupled to the stream equalizer 816, which scales the Y value to generate Y' with the same scaling value as was used to scale the channel output H to H'. During the scaling operation, each subcarrier of Y and H for a particular stream is scaled by a value s, as will be described later. QR decomposition 820a performs the decomposition on the per-stream scaled H', thereby generating $Q^H$ for multiplication of scaled data Y' to generate $Q^H Y$ for use by MIMO decoder along with R. MIMO decoder 722 typically provides values to a LLR decision function (not shown), which then provides the decision to the outer receiver (not shown), which performs deinterleaver, and decoder functions to decode the data.

The AGC function for each stream 808a ... 808n ensures that the total power level in all receive chains is the same. For optimal combining of multiple receiver chains, the noise power in all the receive chains should be made identical. The application of a scaling factor for each receive stream accomplishes this, and the scaling can be done at either the input or the output of the FFT for a particular stream, although it is shown at the FFT output for simplicity.

In a 2×2 MIMO-OFDM system, the received signal at the kth subcarrier is $$\begin{bmatrix} y_1(k) \\ y_2(k) \end{bmatrix} = \begin{bmatrix} h_{11}(k) & h_{12}(k) \\ h_{21}(k) & h_{22}(k) \end{bmatrix} \begin{bmatrix} x_1(k) \\ x_2(k) \end{bmatrix} + \begin{bmatrix} n_1(k) \\ n_2(k) \end{bmatrix} \quad (1)$$

where y(k) is the received stream, h is the characteristic channel matrix coefficient, x is the transmitted data, and n is the noise.

For a two stream case, the noise power $n_1$ observed on stream 1 is $\sigma_1^2(k)$, and the noise power $n_2$ observed on stream 2 is $\sigma_2^2(k)$. For white noise, the noise power observed on each subcarrier is the same, so for simplicity, the subcarrier subscript k is no longer explicitly indicated in the equations. To make the noise power of the input signals to the MIMO detector equal, all of the subcarriers of $y_1$ are multiplied (or scaled) by a scale factor $s_1$ and all subcarriers of $y_2$ are multiplied by a scale factor $s_2$.

The scaling factors $s_1$ and $s_2$ can be derived by making the noise variances equal as follows:

$$s_1^2 \sigma_1^2 = s_2^2 \sigma_2^2 \quad (2)$$

For equal noise power, the final noise power after combining the two signal streams is $2\sigma^2$, such that:

$$s_1^2 \sigma^2 + s_2^2 \sigma^2 = 2\sigma^2 \quad (3)$$

Solving for the above equations:

$$s_1 = \frac{\sqrt{2}\,\sigma_2}{\sqrt{\sigma_1^2 + \sigma_2^2}} \quad (4b)$$

$$s_2 = \frac{\sqrt{2}\,\sigma_1}{\sqrt{\sigma_1^2 + \sigma_2^2}} \quad (4b)$$

Applying the scaling to equation (1) results in:

$$\begin{bmatrix} \frac{\sqrt{2}\,\sigma_2}{\sqrt{\sigma_1^2+\sigma_2^2}} & 0 \\ 0 & \frac{\sqrt{2}\,\sigma_1}{\sqrt{\sigma_1^2+\sigma_2^2}} \end{bmatrix} \begin{bmatrix} y_1 \\ y_2 \end{bmatrix} = \begin{bmatrix} \frac{\sqrt{2}\,\sigma_2}{\sqrt{\sigma_1^2+\sigma_2^2}} & 0 \\ 0 & \frac{\sqrt{2}\,\sigma_2}{\sqrt{\sigma_1^2+\sigma_2^2}} \end{bmatrix} \left( \begin{bmatrix} h_{11} & h_{12} \\ h_{21} & h_{22} \end{bmatrix} \begin{bmatrix} x_1 \\ X_2 \end{bmatrix} + \begin{bmatrix} n_1 \\ n_2 \end{bmatrix} \right) \quad (5)$$

This can be considered as a modified MIMO system, where the channel matrix is $$\begin{bmatrix} \frac{\sqrt{2}\,\sigma_2}{\sqrt{\sigma_1^2+\sigma_2^2}} & 0 \\ 0 & \frac{\sqrt{2}\,\sigma_1}{\sqrt{\sigma_1^2+\sigma_2^2}} \end{bmatrix} \begin{bmatrix} h_{11} & h_{12} \\ h_{21} & h_{22} \end{bmatrix} \quad (6)$$

Note that the first row of the original channel matrix is to be multiplied by $$s_1 = \frac{\sqrt{2}\,\sigma_2}{\sqrt{\sigma_1^2 + \sigma_2^2}},$$

and the second row by $$s_2 = \frac{\sqrt{2}\,\sigma_1}{\sqrt{\sigma_1^2 + \sigma_2^2}}.$$

This requires that the QRD should operate on the modified channel matrix H' and not the original channel matrix H to compute the Q and R matrices during processing of the channel H matrix.

Figure 9:
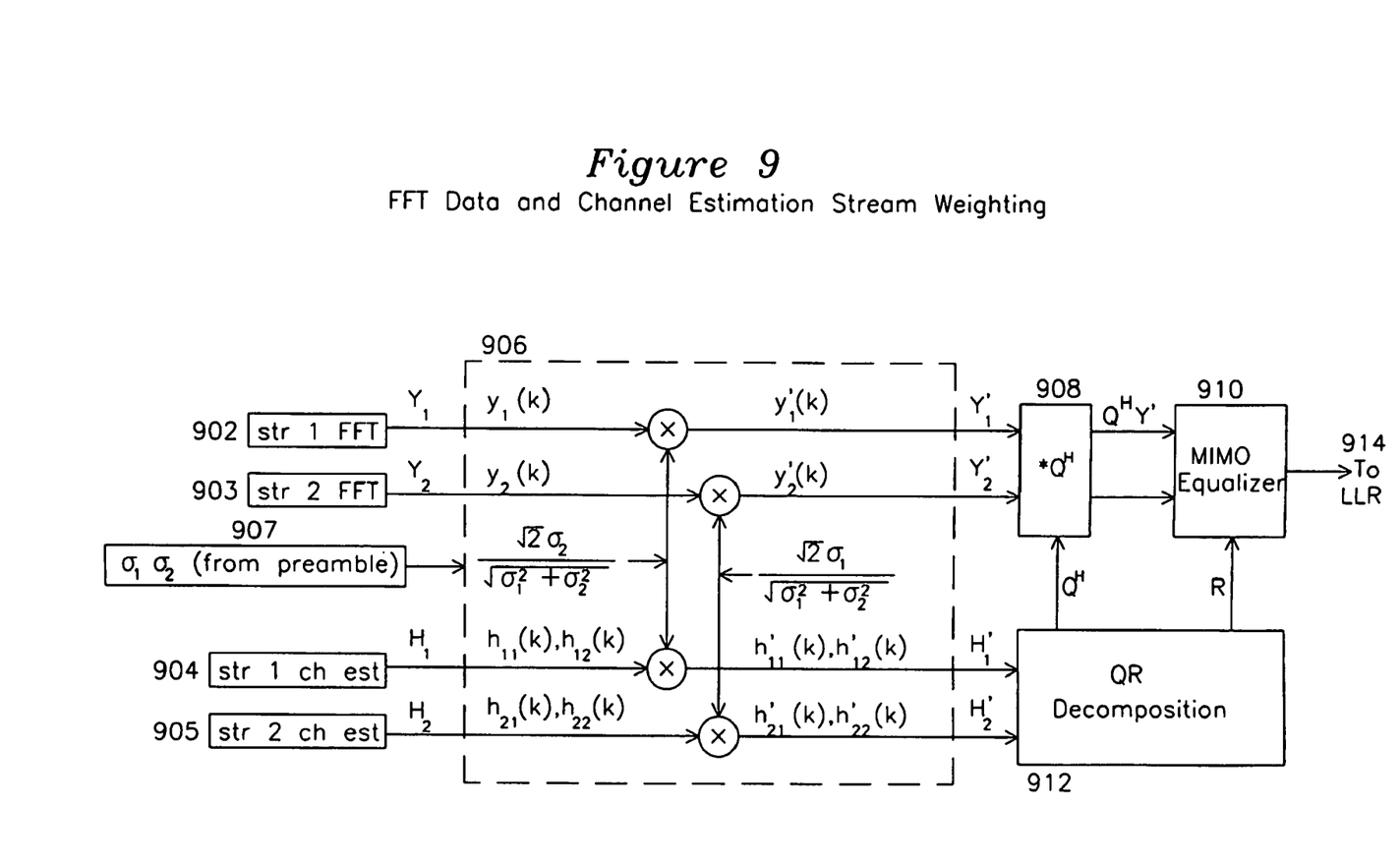
FIG. 9 shows a block diagram for scaling the channel matrix and data stream before QR Decomposition.

FIG. 9 shows an equalizer for the 2×2 MIMO case. The FFTs 902 and 903 generate outputs for each stream Y1 and Y2, respectively, and the channel estimators 904 and 905 produce channel characterization matrices H1 and H2, respectively. The Y stream data and H matrix data are scaled, with all of the H terms for a particular stream equalized using the same multiplier used for the associated stream Y data. The scale factors s1 and s2 are as described earlier $$s_1 = \frac{\sqrt{2}\,\sigma_2}{\sqrt{\sigma_1^2 + \sigma_2^2}},$$

and $$s_2 = \frac{\sqrt{2}\,\sigma_1}{\sqrt{\sigma_1^2 + \sigma_2^2}}.$$

The QR decomposition 912 operates on the scaled H' values to generate $Q^H$ which is multiplied with Y' to form the input to MIMO equalizer in combination with R from the QR decomposition 912. The output 914 of the MIMO equalizer 910 is applied to an LLR function for selection of the likely symbol decision.

For the three channel case, a similar processing method is used at the output of each of the FFTs generating Y and channel equalizer generating H, with the stream weighting coefficients computed from:

$$s_1 = \frac{\sqrt{3}\,\sigma_2\sigma_3}{\sqrt{\sigma_1^2\sigma_2^2 + \sigma_2^2\sigma_3^2 + \sigma_3^2\sigma_1^2}}$$

$$s_2 = \frac{\sqrt{3}\,\sigma_3\sigma_1}{\sqrt{\sigma_1^2\sigma_2^2 + \sigma_2^2\sigma_3^2 + \sigma_3^2\sigma_1^2}}$$

$$s_3 = \frac{\sqrt{3}\,\sigma_1\sigma_2}{\sqrt{\sigma_1^2\sigma_2^2 + \sigma_2^2\sigma_3^2 + \sigma_3^2\sigma_1^2}}$$

What is claimed is:

1. A noise equalizer for a plurality n of data streams, each stream j of said n streams coupled to a receive antenna and baseband converted, each said stream j accompanied by a channel characterization matrix and a noise measurement $\sigma_j$, each said j data stream and each said j channel characterization matrix scaled by a value $$s_j = \frac{\sqrt{n}\,(\sigma_1 * \ldots * \sigma_n)/\sigma_j}{\sqrt{\sum_{k=1}^{n}(\sigma_1^2 * \ldots * \sigma_n^2)/\sigma_k^2}}.$$

2. The noise equalizer of claim 1 where said data stream is from an FFT output.

3. The noise equalizer of claim 1 where said data stream contains OFDM data modulated into subcarriers.

4. The noise equalizer of claim 1 where said data stream contains OFDM data modulated by subcarriers, and each said subcarrier is scaled by said $S_j$ value.

5. The noise equalizer of claim 1 where said data stream contains a plurality m of spatial streams of data, said plurality being equal to or less than said n.

6. The noise equalizer of claim 1 where said n is two, and said first data stream and said first channel characterization matrix is scaled by $$s_1 = \frac{\sqrt{2}\,\sigma_2}{\sqrt{\sigma_1^2 + \sigma_2^2}}$$

and said second data stream and said second channel characterization matrix is scaled by $$s_2 = \frac{\sqrt{2}\,\sigma_1}{\sqrt{\sigma_1^2 + \sigma_2^2}}.$$

7. The noise equalizer of claim 1 where said n is three, and said first data stream and said first channel characterization matrix is scaled by s1, said second data stream and said second channel characterization matrix is scaled by s2, and said third data stream and said third channel characterization matrix is scaled by s3, where:

$$s_1 = \frac{\sqrt{3}\,\sigma_2\sigma_3}{\sqrt{\sigma_1^2\sigma_2^2 + \sigma_2^2\sigma_3^2 + \sigma_3^2\sigma_1^2}}$$

$$s_2 = \frac{\sqrt{3}\,\sigma_3\sigma_1}{\sqrt{\sigma_1^2\sigma_2^2 + \sigma_2^2\sigma_3^2 + \sigma_3^2\sigma_1^2}}$$

$$s_3 = \frac{\sqrt{3}\,\sigma_1\sigma_2}{\sqrt{\sigma_1^2\sigma_2^2 + \sigma_2^2\sigma_3^2 + \sigma_3^2\sigma_1^2}}.$$

8. A noise equalizer for a plurality n of data streams, each stream j of said n streams coupled to a receive antenna, baseband converted, and transformed into a subcarrier frequency, each said stream j accompanied by a channel characterization matrix and a noise measurement $\sigma_j$, whereby for a particular data stream and associated channel characterization matrix, if said particular data stream is associated with a larger $\sigma_j$ than a different data stream with a comparatively smaller $\sigma_j$, said particular data stream is multiplied by a scaling factor which is smaller than the scaling factor for said different data stream.

9. The noise equalizer of claim 8 where said scaling factor for a channel j is $$s_j = \frac{\sqrt{n}\,(\sigma_1 * \ldots * \sigma_n)/\sigma_j}{\sqrt{\sum_{k=1}^{n}(\sigma_1^2 * \ldots * \sigma_n^2)/\sigma_k^2}}.$$

10. The noise equalizer of claim 8 where said data stream is from an FFT output.

11. The noise equalizer of claim 8 where said data stream contains OFDM data modulated into subcarriers.

12. The noise equalizer of claim 8 where said data stream contains OFDM data modulated by subcarriers, and each said subcarrier is scaled by said $S_j$ value.

13. The noise equalizer of claim 8 where said data stream contains a plurality m of spatial streams of data, said plurality being equal to or less than said n.

14. The noise equalizer of claim 8 where said n is two, and said first data stream and said first channel characterization matrix is scaled by $$s_1 = \frac{\sqrt{2}\,\sigma_2}{\sqrt{\sigma_1^2 + \sigma_2^2}}$$

and said second data stream and said second channel characterization matrix is scaled by $$s_2 = \frac{\sqrt{2}\,\sigma_1}{\sqrt{\sigma_1^2 + \sigma_2^2}}.$$

15. The noise equalizer of claim 8 where said n is three, and said first data stream and said first channel characterization matrix is scaled by s1, said second data stream and said second channel characterization matrix is scaled by s2, and said third data stream and said third channel characterization matrix is scaled by s3, where:

$$s_1 = \frac{\sqrt{3}\,\sigma_2\sigma_3}{\sqrt{\sigma_1^2\sigma_2^2 + \sigma_2^2\sigma_3^2 + \sigma_3^2\sigma_1^2}}$$

$$s_2 = \frac{\sqrt{3}\,\sigma_3\sigma_1}{\sqrt{\sigma_1^2\sigma_2^2 + \sigma_2^2\sigma_3^2 + \sigma_3^2\sigma_1^2}}$$

$$s_3 = \frac{\sqrt{3}\,\sigma_1\sigma_2}{\sqrt{\sigma_1^2\sigma_2^2 + \sigma_2^2\sigma_3^2 + \sigma_3^2\sigma_1^2}}.$$

* * * * *